May 14, 1929.  C. VAN BRUNT  1,713,200
OIL RECLAIMING PROCESS
Filed April 1, 1925
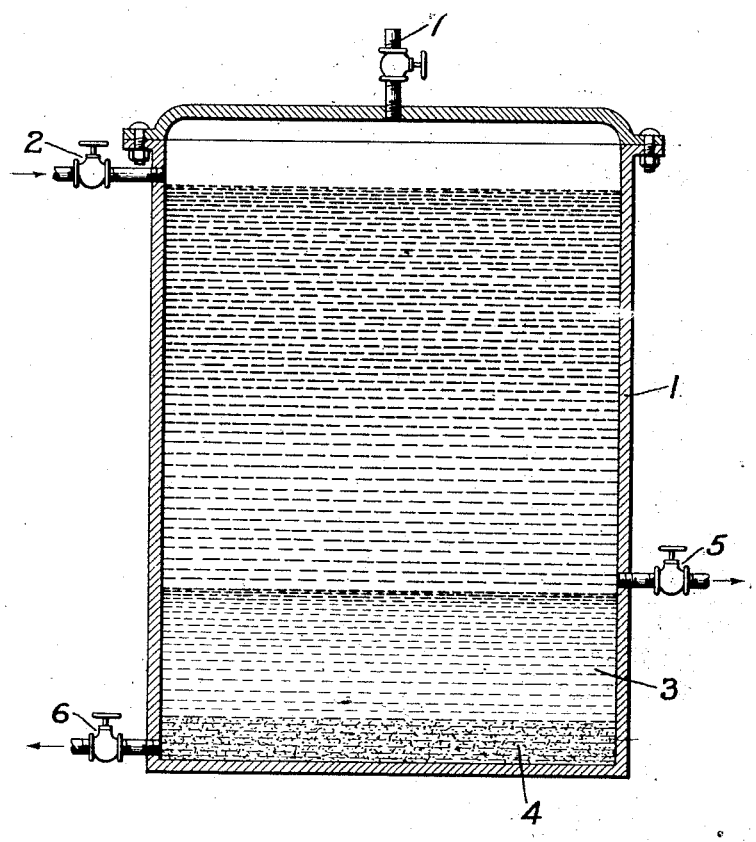
Inventor:
Charles Van Brunt,
by
His Attorney.

Patented May 14, 1929.

1,713,200

UNITED STATES PATENT OFFICE.

CHARLES VAN BRUNT, OF SCHENECTADY, NEW YORK, ASSIGNOR TO GENERAL ELECTRIC COMPANY, A CORPORATION OF NEW YORK.

OIL-RECLAIMING PROCESS.

Application filed April 1, 1925. Serial No. 20,005.

The present application relates to the treatment of petroleum products containing suspended matter, for example, spent lubricating oil from an automobile crank case, and its object is to improve the efficiency of the clarifying process.

In my prior application, Serial No. 746,640 of October 29, 1924, I have described a method whereby a suspended solid matter in mineral, lubricating oil may be removed by mixing the oil first with an aqueous solution of water glass, that is, a silicate of an alkali metal. The water glass envelops and agglomerates the solid matter so that it may readily become wetted and removed by subsidence in water. Some oils have been found to be less responsive than others to this method of purification with water glass.

I have discovered that the addition to oil to be purified, of a sludge formed in mineral oil by oxidation renders the oil more responsive to the clarifying effect of water glass when used in accordance with my invention.

In order that the relation of my present improvement to the water glass process of purifying oil, and spent crank case oil in particular, may be fully understood, I have shown in the accompanying drawing, as a vertical section, a simple apparatus in which the process may be carried out.

Two features are of importance in the clarification of oil by means of the water glass process, namely, the rate of subsidence of the solid matter and second the completeness of clarification of the oil. In the absence of a resinous coagulating material, some lubricating oil required as long as twelve hours time to complete subsidence of the suspended solid matter into a body of water from oil admixed with water glass, whereas other samples of oil would become cleared of suspended solid matter in less than half an hour. Turbidity of the cleaned oil is undesirable as in some cases the turbidity may be due to finely divided water glass remaining in the oil. Although this residue of suspended water glass is removed by the subsequent flow of the oil over the heated surface of a rectifier whereby gasoline and other diluents are removed, and hence does not injure the final product, nevertheless turbidity due to suspended water glass is undesirable. The clarification process should be carried out both speedily and with the greatest possible degree of completeness.

The addition of the oxidation product of mineral oil known as sludge improves both the rate of subsidence and the completeness of clarification.

In carrying out my invention, about 0.5 per cent by weight of sludge, such as formed, for example, by oxidation at high temperature in mineral oils, is added to the oil to be reclaimed. I may use for this purpose the sludge, or precipitated semi-fluid material formed in transformer oil during use. Such material is a complex oxidation product of the oil containing high molecular weight acids of undetermined composition, asphaltic acids, metallic soaps, polymerized and condensed products and intermediate products. It occurs in some cases as a heavy, viscous liquid and in other cases as a plastic solid. The acid bodies in the oil sludge, in my opinion, are the most useful ingredient for promoting the flocculation of impurities in spent lubricating oil by means of water glass. These oxidation products, herein called sludge, are soluble in chloroform and benzene, and insoluble in petroleum ether. As it would be inconvenient to first test the susceptibility of various oils to be reclaimed, the above proportion of sludge oil is added to the oil to be reclaimed in all cases. Water glass in suitable amount then is added to the mixture of oil and sludge, say from about 1 to 4 ounces of water glass of a concentration of 40° Bé. gravity to one gallon of oil.

Upon thorough mixture of the water glass with the oil, for example, by agitation, preferably in the presence of air, the mixture is brought into contact with a body of water which, as indicated in the drawing, is of sufficient bulk to take up the suspended matter.

The drawing shows a simple apparatus for carrying out a batch treatment of oil in accordance with my invention. The drawing shows in vertical section a container into which dirty oil is introduced, the oil being mixed with treating agents in accordance with my invention. The sludged oil is added to the impure oil and then water glass is added and is caused to be dispersed as droplets in the oil by stirring. The agglomerated impurities drop into the water as described in the Journal of Industrial and Engineering Chemistry, vol. 17, p. 418, the pure oil then being drawn off.

The oil containing dispersed water glass is introduced into a tank 1, through an inlet tube 2, into contact with a body of water 3, which is heated to about 80° C., thereby causing the solid matter to subside into the water from the oil, forming a sediment layer 4, in the tank. The purified oil is removed when settling is complete by an outlet tube 5. The sediment may be drawn off from time to time by an outlet cock 6, fresh water being supplied through the inlet cock 7, which may also serve as an air vent valve. This relatively simple settling apparatus advantageously may be replaced by a continuously operating counter current apparatus, as described in my prior application, Serial No. 746,640, but for the sake of brevity a description of the more highly developed apparatus is not here included.

What I claim as new and desire to secure by Letters Patent of the United States is:—

1. The process of improving the rate and completeness of removal of suspended solid matter from used mineral, lubricating oil by the action of water glass which consists in adding to oil which is clarified with difficulty a quantity of oxidized sludged mineral oil.

2. A preliminary step in the process of removing suspended solid matter from used mineral, lubricating oil by the action of an aqueous solution of water glass which consists in adding to the oil to be clarified one-half per cent by weight of oxidized sludged mineral oil.

3. The process of clarifying a mineral oil containing suspended matter formed therein by use at high temperatures which consists in adding a fractional per cent of oxidized sludged mineral oil to said product, thereupon dispersing in said product droplets of an aqueous solution of a silicate of an alkali metal thereby forming a sediment capable of being wet and finally causing said sediment to subside into a body of water.

In witness whereof, I have hereunto set my hand this 31st day of March, 1925.

CHARLES VAN BRUNT.